United States Patent
Raphael et al.

(10) Patent No.: US 11,132,755 B2
(45) Date of Patent: Sep. 28, 2021

(54) EXTRACTING, DERIVING, AND USING LEGAL MATTER SEMANTICS TO GENERATE E-DISCOVERY QUERIES IN AN E-DISCOVERY SYSTEM

(71) Applicant: International Business Machines Corporation, Armonk, NY (US)

(72) Inventors: Roger C. Raphael, San Jose, CA (US); Rajesh M. Desai, San Jose, CA (US); Nazrul Islam, San Jose, CA (US); Satwik Hebbar, Chennai (IN)

(73) Assignee: International Business Machines Corporation, Armonk, NY (US)

( * ) Notice: Subject to any disclaimer, the term of this patent is extended or adjusted under 35 U.S.C. 154(b) by 508 days.

(21) Appl. No.: 16/175,492

(22) Filed: Oct. 30, 2018

(65) Prior Publication Data

US 2020/0134757 A1    Apr. 30, 2020

(51) Int. Cl.
*G06Q 50/18* (2012.01)
*G06N 5/02* (2006.01)
(Continued)

(52) U.S. Cl.
CPC ......... *G06Q 50/18* (2013.01); *G06F 16/2423* (2019.01); *G06F 16/36* (2019.01);
(Continued)

(58) Field of Classification Search
CPC ....... G06F 16/9024; G06F 40/30; G06N 5/02; G06Q 50/18
See application file for complete search history.

(56) References Cited

U.S. PATENT DOCUMENTS 6,195,657 B1    2/2001  Rucker et al.
7,676,485 B2    3/2010  Elfayoumy et al.
(Continued)

OTHER PUBLICATIONS

Mell et al., "Effectively and Securely Using the Cloud Computing Paradigm" dated Oct. 7, 2009, NIST, Information Technology Laboratory, Total 80 pages.
(Continued)

*Primary Examiner* — Charles E Lu
(74) *Attorney, Agent, or Firm* — Konrad, Raynes, Davda and Victor LLP; Janaki K. Davda

(57) ABSTRACT

Provided are techniques for extracting, deriving, and using legal matter semantics to generate e-discovery queries in an e-discovery system. A semantic knowledge graph is iteratively built by receiving meet and confer document instances, legal matter types, historical e-discovery queries for different legal matters, and legal semantic types extracted from the historical e-discovery queries. The legal semantic types are added to the semantic knowledge graph, and a list of terms that serve as a basis of an initial query are identified. An e-discovery query is generated for an e-discovery system. The e-discovery query is modified using the semantic knowledge graph and additional input by receiving a legal matter type and meet and confer information, obtaining the legal semantic types that are relevant to the legal matter type and the meet and confer information, and modifying the e-discovery query. The modified e-discovery query is provided. Then, the modified e-discovery query is executed.

18 Claims, 9 Drawing Sheets

(51) Int. Cl.
*G06F 16/93* (2019.01)
*G06F 16/242* (2019.01)
*G06F 16/901* (2019.01)
*G06F 16/9535* (2019.01)
*G06F 40/30* (2020.01)
*G06F 40/295* (2020.01)
*G06F 16/36* (2019.01)

(52) U.S. Cl.
CPC .......... *G06F 16/9024* (2019.01); *G06F 16/93* (2019.01); *G06F 16/9535* (2019.01); *G06F 40/295* (2020.01); *G06F 40/30* (2020.01); *G06N 5/02* (2013.01)

(56) References Cited

U.S. PATENT DOCUMENTS

| | | | |
|---|---|---|---|
| 8,583,669 | B2 | 11/2013 | Kumar |
| 8,782,039 | B2 | 7/2014 | Byrne et al. |
| 8,965,918 | B2 | 2/2015 | Dettinger et al. |
| 9,632,654 | B1* | 4/2017 | Elassaad ............... G06F 3/0481 |
| 10,083,176 | B1* | 9/2018 | Desai ................. G06F 16/31 |
| 2008/0209181 | A1* | 8/2008 | Petkov ................ G06F 30/327 712/220 |
| 2011/0106807 | A1* | 5/2011 | Srihari ................. G06F 16/288 707/739 |
| 2011/0137636 | A1* | 6/2011 | Srihari .................. G06F 40/53 704/2 |
| 2013/0117218 | A1 | 5/2013 | Fan et al. |
| 2016/0196518 | A1 | 7/2016 | Zabawa |
| 2016/0335544 | A1 | 11/2016 | Bretschneider et al. |
| 2017/0024460 | A1* | 1/2017 | Mac an tSaoir ...... G06F 16/334 |
| 2017/0116519 | A1* | 4/2017 | Johnson .................. G06N 3/08 |
| 2017/0147635 | A1 | 5/2017 | McAteer et al. |
| 2017/0228239 | A1* | 8/2017 | Elassaad ............ G06F 16/9536 |
| 2017/0235848 | A1* | 8/2017 | Van Dusen ........... G06F 16/904 705/12 |
| 2018/0082183 | A1* | 3/2018 | Hertz .................... G06Q 10/10 |
| 2019/0278777 | A1* | 9/2019 | Malik .................. G06F 16/367 |
| 2020/0090053 | A1* | 3/2020 | Silverman ............... G06F 40/30 |

OTHER PUBLICATIONS

Mell et al., "The NIST Definition of Cloud Computing" dated Sep. 2011, Computer Security Division Information Technology Laboratory National Institute of Standards and Technology, Total 7 pages.

Joshi et al., "ALDA: Cognitive Assistant for Legal Document Analytics" dated 2016, The 2016 AAAI Fall Symposium Series: Cognitive Assistance in Government and Public Sector Applications, Total 4 pages.

Breaux et al., "Mapping Legal Requirements to IT Controls" 2013 6th International Workshop on Requirements Engineering and Law (RELAW), 2013 IEEE, Total 10 pages.

McBride et al., "Representing and Querying Historical Information in RDF with Application to E-Discovery", HP Laboratories Technical Report, HPL-2009-261, dated 2009, Total 14 pages.

Butler et al., "Semantic Middleware for E-Discovery", 2009 IEEE International Conference on Semantic Computing, dated 2009, Total 6 pages.

Van Dijk et al., "Semantic Search in E-Discovery", Research on the application of text mining and information retrieval for fact finding in regulatory investigations, In DESI IV Workshop on Setting Standards for Searching Electronically Stored Information in Discovery Proceedings, dated 2011, Total 4 pages.

Qing-Ying et al., "Working Structure Knowledge Acquisition from Mechanical Product Patent based on Natural Language Understanding", 2009 World Congress on Computer Science and Information Engineering, vol. 5, IEEE 2008, Total 5 pages.

Aquiar et. al., "Conceptual Mapping as a Communication Tool of Legal Requirements," 2016 11th Iberian Conference on Information Systems and Technologies (CISTI), Dated 2016, Total 6 pages.

"EDRM Glossary" (online) retrieved from the Internet on Oct. 30, 2018 at URL>http://www.edrm.net/collections/edrmglossary/, Total 20 pages.

\* cited by examiner

EXTRACTING, DERIVING, AND USING LEGAL MATTER SEMANTICS TO GENERATE E-DISCOVERY QUERIES IN AN E-DISCOVERY SYSTEM

BACKGROUND

1. Field of the Invention

Embodiments of the invention relate to extracting, deriving, and using legal matter semantics to generate e-discovery queries in an e-discovery system. In certain embodiments, an e-discovery query is generated, and then the e-discovery query is modified based on obtained legal semantic types to add one or more predicates that capture historical information based on user feedback. The modified e-discovery query is provided as a suggested query. In response to receiving selection of the modified e-discovery query, the modified e-discovery query is executed.

2. Description of the Related Art

Traditional e-discovery systems involve aligning Information Technology (IT) and legal teams so that they can come together to discover relevant data for a particular legal matter in a timely manner. IT teams have the burden of translating the discovery requests from the legal teams into queries and investigative projects that find a list of relevant data to be served back to the legal teams. Then, the legal teams review and pare down this list of relevant data to what is particularly relevant to the legal matter.

However, there is a first problem in that it takes a great deal of effort for the legal users to translate their semantic understanding of what kind of data they want to collect into queries that traditional IT-driven e-discovery systems are able to execute.

Moreover, there is a second problem in that it may take a large amount of time and human effort to review the results of a poorly designed e-discovery request that adds up to not only a huge legal bill, but also risks timeliness in meeting deadlines set by judicial entities.

Thus, with traditional solutions, there is a gap between the legal users and the IT team. For example, the legal users may have a clear understanding of the legal matter at hand and may describe what data they need, who needs to be involved, and what data protection needs to be applied to comply with legal guidelines that apply to the legal matter. IT teams may not have such an understanding, but the IT teams hold the key to realizing the discovery of data sets and enforcing compliance on the data sources they manage.

The better the e-discovery system is at understanding a legal user's requirements and translating them to actions that the e-discovery system takes on behalf of or in combination with IT teams, the easier it becomes to fulfill e-discovery requests in a timely manner.

SUMMARY

In accordance with embodiments, a computer-implemented method is provided for extracting, deriving, and using legal matter semantics to generate e-discovery queries in an e-discovery system. In accordance with other embodiments, a computer program product is provided for extracting, deriving, and using legal matter semantics to generate e-discovery queries in an e-discovery system. The computer program product comprising a computer readable storage medium having program code embodied therewith, the program code executable by at least one processor to perform operations. In yet other embodiments, a computer system is provided for extracting, deriving, and using legal matter semantics to generate e-discovery queries in an e-discovery system. The computer system comprises one or more processors, one or more computer-readable memories and one or more computer-readable, tangible storage devices; and program instructions, stored on at least one of the one or more computer-readable, tangible storage devices for execution by at least one of the one or more processors via at least one of the one or more memories, to perform operations.

In certain embodiments, the computer-implemented method, computer program product, and computer system perform iteratively building a semantic knowledge graph during a build phase by receiving meet and confer document instances, legal matter types, historical e-discovery queries for different legal matters, and legal semantic types extracted from the historical e-discovery queries. The legal semantic types are added to the semantic knowledge graph. In response to adding the legal semantic types to the semantic knowledge graph, a list of terms are identified that serve as a basis of an initial query. Then, an e-discovery query is generated for an e-discovery system.

Initially, a predicate clause of the initial query is mapped to a legal semantic type by: identifying a metadata field and operator combination, determining the legal semantic type from a glossary, adding a first semantic type node to the semantic knowledge graph, connecting the first semantic type node to a legal matter node with an edge weight, and adding an expression term node for the metadata field with another edge weight. Then, a keyword of a text clause of the initial query is mapped to a legal semantic type by: running a partial query for the keyword against a saved result set to generate a new result set, and for each document in the new result set, retrieving surrounding text around a location within the document where the keyword was found, applying Named Entity Recognition (NER) to the keyword using surrounding text as context, adding a second semantic type node for an entity type node, connecting the second semantic type node to the legal matter node with an edge weight, and adding an expression term node for the keyword with another edge weight.

The e-discovery query is modified using the semantic knowledge graph and additional input during a query generation phase. A legal matter type and meet and confer information is received. A series of questions is issued to obtain the legal semantic types that are relevant to the legal matter type and the meet and confer information, where a priority of an order of questions is determined by weight associated with occurrence of those legal semantic types in the semantic knowledge graph. The e-discovery query is modified based on the obtained legal semantic types to add one or more predicates that capture historical information based on user feedback responding to the series of questions. The modified e-discovery query is provided as a suggested query. In response to receiving selection of the modified e-discovery query, the modified e-discovery query is executed by the e-discovery system.

BRIEF DESCRIPTION OF THE SEVERAL VIEWS OF THE DRAWINGS

Referring now to the drawings in which like reference numbers represent corresponding parts throughout.

DETAILED DESCRIPTION

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

With embodiments, there is historical knowledge that bridges the gap between IT team and legal users. Embodiments capture this historical knowledge and reuse the historical knowledge to generate e-discovery queries for future similar cases.

Figure 1:
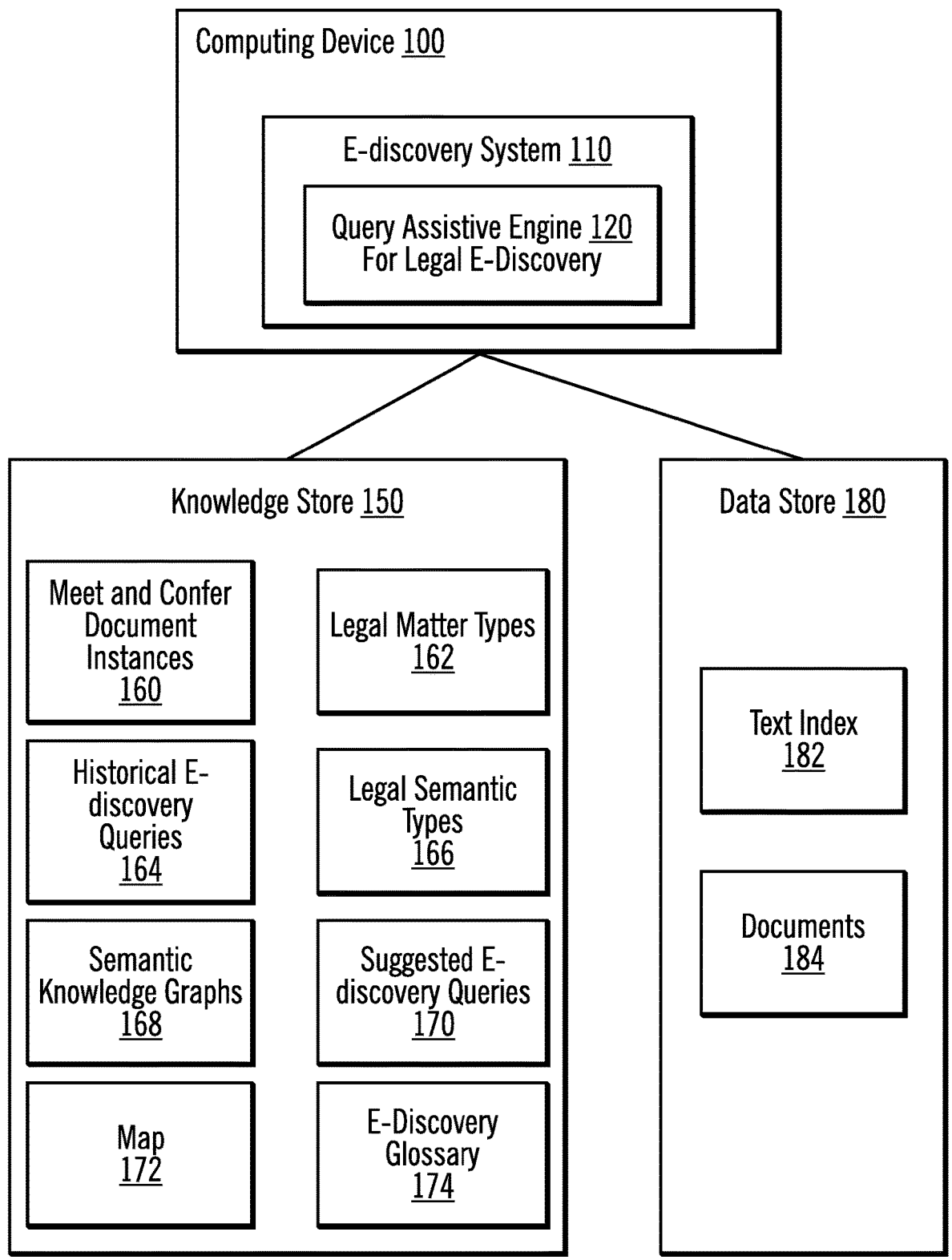
FIG. 1 illustrates, in a block diagram, a computing environment in accordance with certain embodiments.

FIG. 1 illustrates, in a block diagram, a computing environment in accordance with certain embodiments. A computing device 100 is coupled to a knowledge store 150 and to a data store 180. The computing device 100 includes an e-discovery system 110, which includes a query assistive engine 120 for legal e-discovery. The query assistive engine 120 generates new e-discovery queries that are to be executed by the e-discovery system 110 against documents. In certain embodiments, the e-discovery system 110 is a self-service e-discovery system 110.

The knowledge store 150 includes information used by the query assistive engine 120. In certain embodiments, the knowledge store 150 includes: meet and confer document instances 160, legal matter types 162, historical e-discovery queries 164, legal semantic types 166, semantic knowledge graphs 168, suggested e-discovery queries 170, a map 172, and an e-discovery glossary 174. Legal matter types 162 may also be referred to as legal matter categories or legal matter classes.

The meet and confer document instances 160 may be described as finalized instances of documents in an arbitrary format obtained as part of the closing of the meet and confer process. In certain embodiments, the meet and confer document instances 160 may be described as a collection of document instances of type meet and confer. In certain embodiments, the document instances 160 may be described as document types from meet and confer documents for known legal matter types exchanged in early phase e-discovery. In various embodiments, the meet and confer document instances 160 may be any combination of digital instances and physical instances.

The historical e-discovery queries 164 may be described as prior e-discovery queries used in historic litigation in an organization. The legal semantic types 166 may be extracted from the historical e-discovery queries 164.

The data store 180 includes a text index 182 and documents 184. The e-discovery engine 110 may execute e-discovery queries generated by the query assistive engine 120 using the text index 182 to identify the documents 184 that meet the search terms of the e-discovery queries.

The query assistive engine 120 allows legal users (e.g., legal experts) to directly pose queries for an e-discovery request. The query assistive engine 120 accumulates knowledge of what kind of queries are utilized within a given legal matter context. This knowledge is accumulated in a semantic knowledge graph and is used graph to provide assists for future queries based on the particular legal matter context and how similar e-discovery requests were dealt with in the past. The knowledge also includes feedback from the legal users in terms of how the query assistive engine 120 performed in allowing the legal users to meet their targets of cost, human effort, and timeliness.

Figure 2:
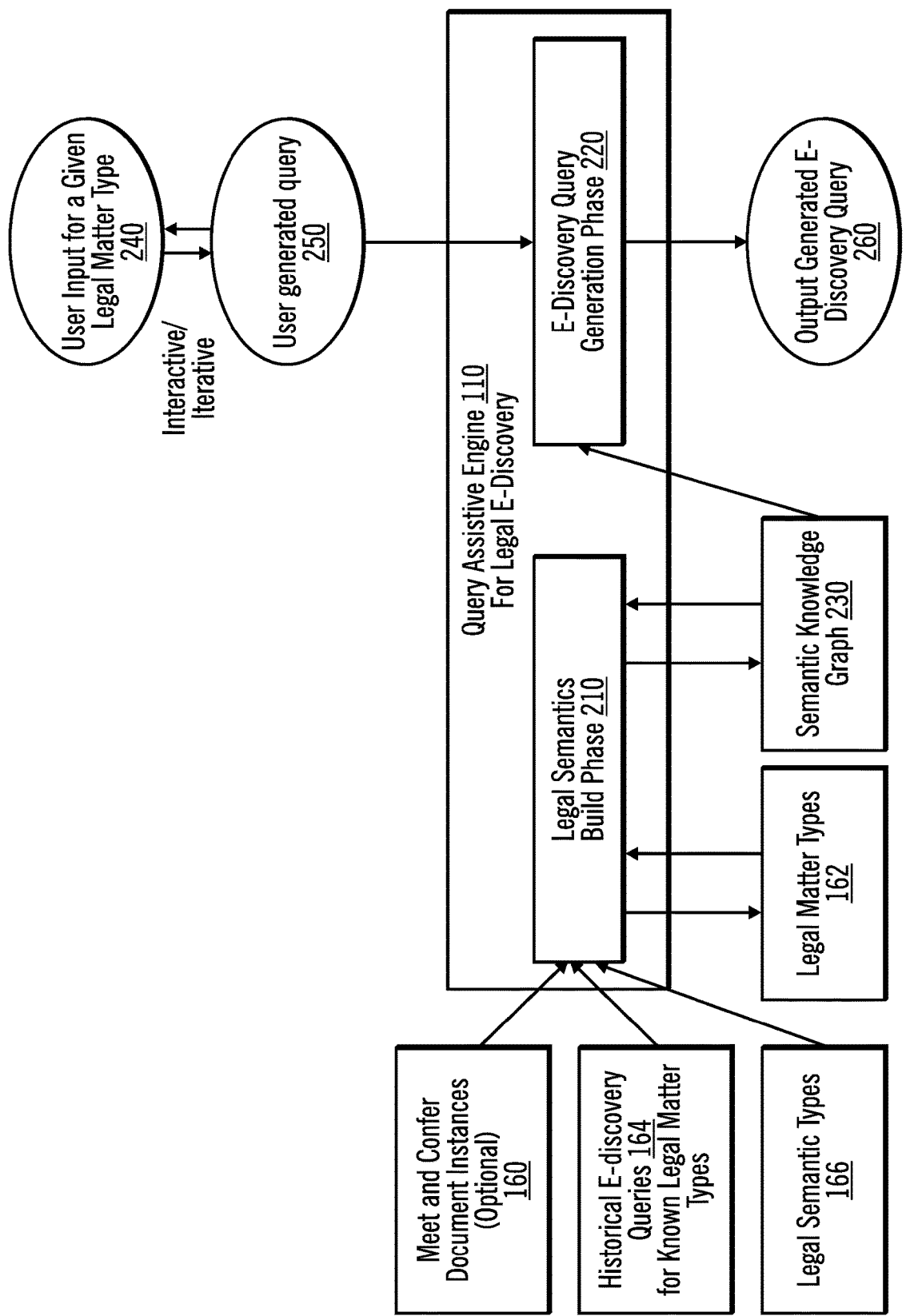
FIG. 2 illustrates, in a block diagram, further details of a query assistive engine 120 in accordance with certain embodiments.

FIG. 2 illustrates, in a block diagram, further details of a query assistive engine 120 in accordance with certain embodiments. The query assistive engine 120 includes a legal semantics build phase 210 and an e-discovery query generation phase 220.

User input for a given legal matter type 240 is interactively and iteratively used to produce a user generated query 250.

The legal semantics build phase 210 receives meet and confer document instances 160, legal matter types 162 (e.g., from a legal matter library), historical e-discovery queries 164 for known legal matter types, legal semantic types 166. The legal semantics build phase 210 then iteratively builds a semantic knowledge graph 230. The semantic knowledge graph 230 and a user generated query 250 are input to the e-discovery query generation phase 220, and the e-discovery query generation phase 220 outputs an e-discovery query 260 that is executed by the e-discovery system 110. In certain embodiments, the legal matters are instances of legal matter types.

Figure 3:
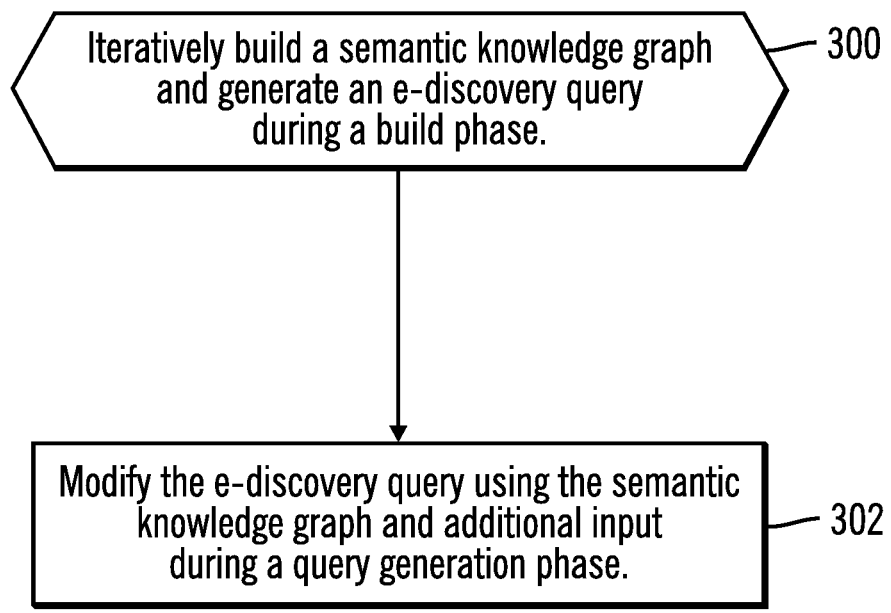
FIG. 3 illustrates, in a flowchart, operations for generating an e-discovery query in accordance with certain embodiments.

FIG. 3 illustrates, in a flowchart, operations for generating an e-discovery query in accordance with certain embodiments. Control begins at block 300 with the query assistive engine 120 iteratively building a semantic knowledge graph and generating an e-discovery query during a build phase. In block 302, the query assistive engine 120 modifying the e-discovery query using the semantic knowledge graph and additional input during a query generation phase.

Figure 4:
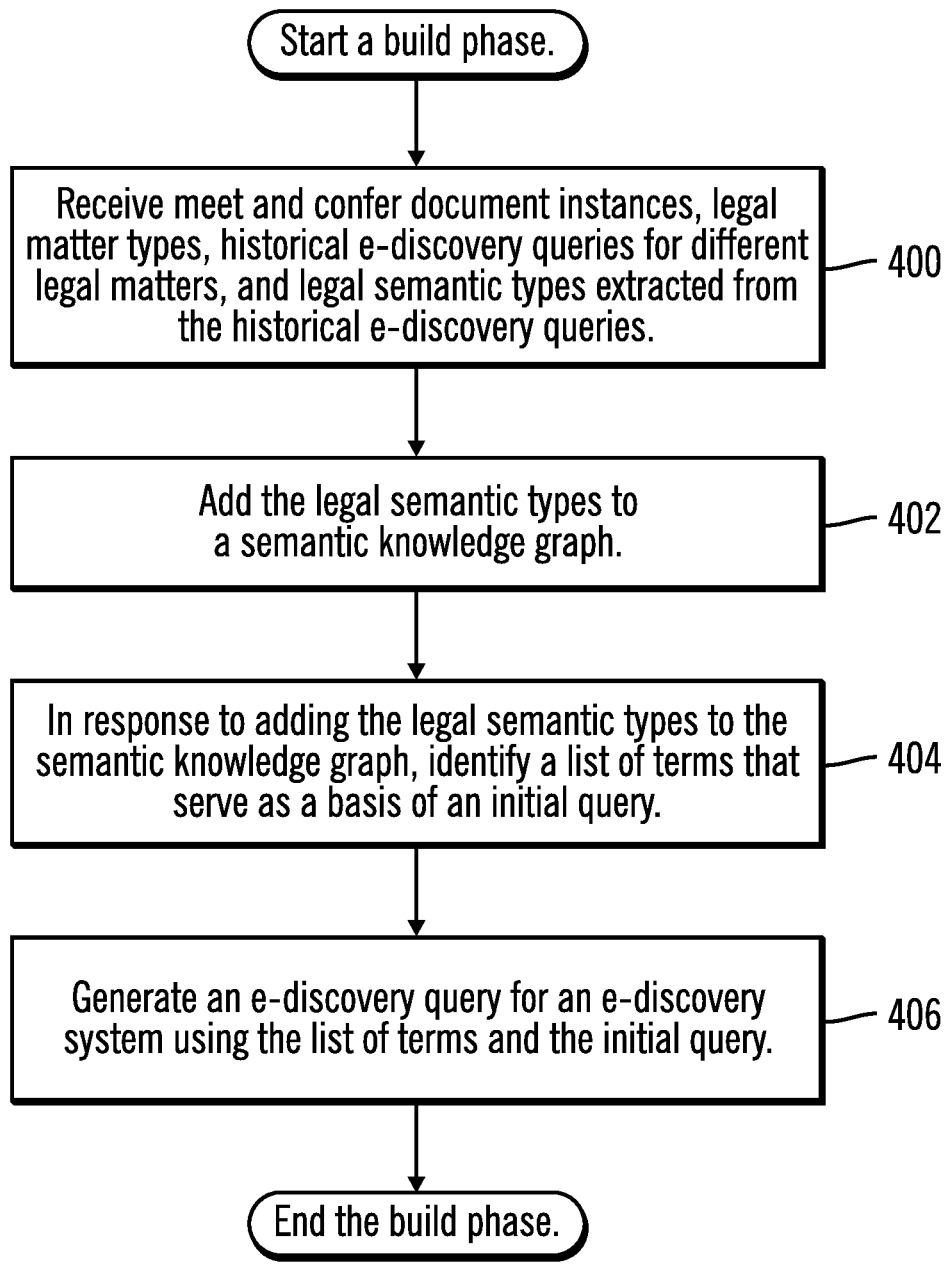
FIG. 4 illustrates, in a flowchart, operations for a build phase in accordance with certain embodiments.

FIG. 4 illustrates, in a flowchart, operations for a build phase in accordance with certain embodiments. Control begins at block 400 with the query assistive engine 120 receiving meet and confer document instances, legal matter types, historical e-discovery queries for different legal matters, and legal semantic types extracted from the historical e-discovery queries. In block 402, the query assistive engine 120 adds the legal semantic types to a semantic knowledge graph. In block 404, in response to adding the legal semantic types to the semantic knowledge graph, the query assistive engine 120 identifies a list of terms that serve as a basis of an initial query. In certain embodiments, a legal user provides the initial query to the query assistive engine 120. In other embodiments, the query assistive engine 120 generates the initial query (e.g., by asking questions of the legal user).

In yet other embodiments, the legal users (e.g., counsel for both sides of the case) agree on a list of terms. In block 406, the query assistive engine 120 generates the initial query for the meet and confer documents.

Figure 5:
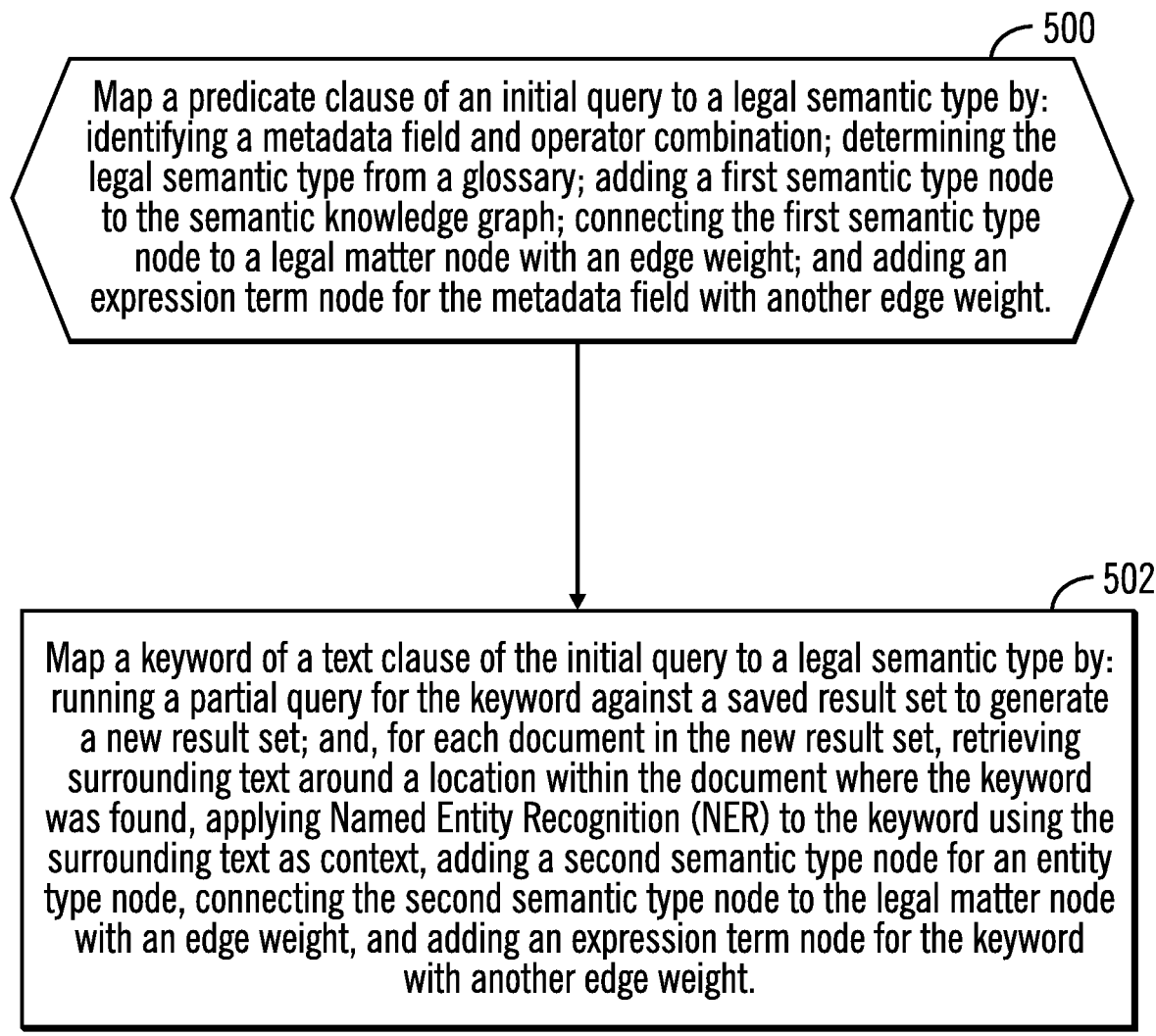
FIG. 5 illustrates, in a flowchart, operations for generating an e-discovery query in accordance with certain embodiments.

FIG. 5 illustrates, in a flowchart, operations for generating an e-discovery query in accordance with certain embodiments. Control begins at block 500 with the query assistive engine 120 mapping a predicate clause of an initial query to a legal semantic type by: identifying a metadata field and operator combination; determining the legal semantic type from a glossary; adding a first semantic type node to the semantic knowledge graph; connecting the first semantic type node to a legal matter node with an edge weight; and adding an expression term node for the metadata field with another edge weight. In block 502, the query assistive engine 120 maps a keyword of a text clause of the initial query to a legal semantic type by: running a partial query for the keyword against a saved result set to generate a new result set; and for each document in the new result set, retrieving surrounding text around a location within the document where the keyword was found, applying Named Entity Recognition (NER) to the keyword using surrounding text as context, adding a second semantic type node for an entity type node, connecting the second semantic type node to the legal matter node with an edge weight, and adding an expression term node for the keyword with another edge weight.

Figure 6:
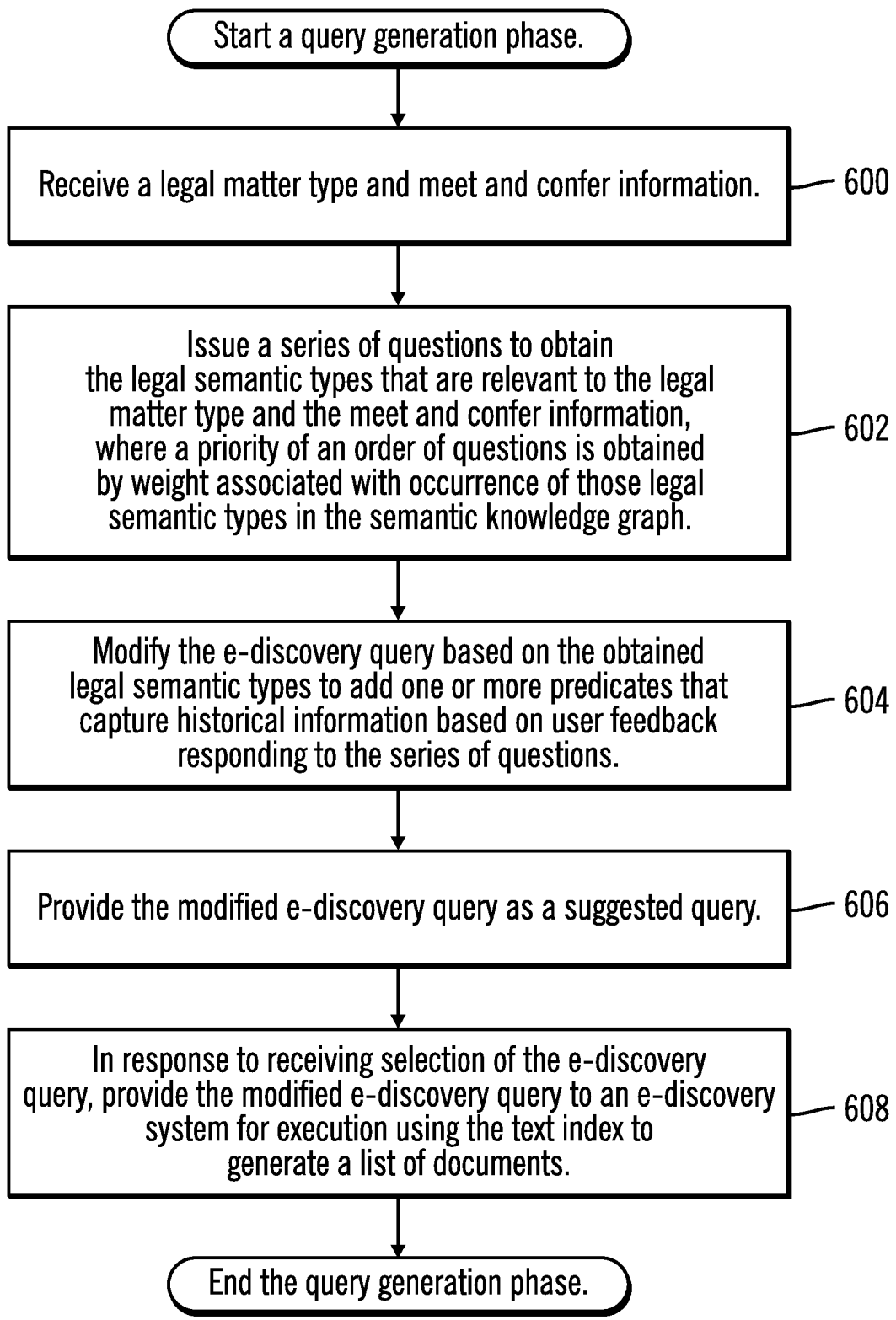
FIG. 6 illustrates, in a flowchart, operations for a query generation phase in accordance with certain embodiments.

FIG. 6 illustrates, in a flowchart, operations for a query generation phase in accordance with certain embodiments. Control begins at block 600 with the query assistive engine 120 receiving a legal matter type and meet and confer information. In certain embodiments, examples of meet and confer information include: search terms, initial custodians involved, scope of search (e.g., date range), etc. For example, in a patent infringement, relevant search terms may be "design document", "architecture", "power point", etc. These search terms may be related to a specific patent issue, such as "caching" in a case in which the patent issue relates to infringement in performance improvement. In certain embodiments, the initial custodians may be managers, product owners, developers working in the relevant product area where the infringement is claimed, etc.

In block 602, the query assistive engine 120 issues a series of questions to obtain the legal semantic types that are relevant to the legal matter type and the meet and confer information, wherein a priority of an order of questions are obtained by weight associated with occurrence of those legal semantic types in the semantic knowledge graph. In block 604, the query assistive engine 120 modifies the e-discovery query based on the obtained legal semantic types to add one or more predicates that capture historical information based on user feedback responding to the series of questions. In block 606, the query assistive engine 120 provides the modified e-discovery query as a suggested query. In block 608, in response to receiving selection of the modified e-discovery query, the query assistive engine 120 provides the modified e-discovery query to the e-discovery system 110 for execution using the text index to generate a list of documents. Thus, the e-discovery system 110 executes the modified e-discovery query.

Merely to enhance understanding, an example is provided herein. In this example, the legal matter types are industry specific, and the semantic knowledge graph is specific to a company's legal history. In this example, each time the query assistive engine 120 is to generate the e-discovery query, the semantic knowledge graph may be different. In this example, potential legal matter types may be "Financial fraud", "discrimination", "Patent infringement".

Continuing with this example, the "Patent infringement" legal matter type for a given organization may be for specific attorneys that deal with the cases involving patent infringement, and those attorneys are closely associated with the litigation for the patent infringement. The query assistive engine 120 starts with highly associated attorney names. Once an attorney name is selected, then the query assistive engine 120 determines that the selected attorney usually deals with patents relating to an area, such as e-commerce. Next, walking the semantic knowledge graph, the query assistive engine 120 discovers key words that are associated with the attorney, such as "buy", "sell", "security", "cart", "Orders", "deals", "products", "suppliers", etc. These highly associated words may be established given the historical data relating to the patents involving e-commerce. There are a few groups that are working in the area of e-commerce. The employees in these few groups associated with working in the given technology are found using the semantic knowledge graph. Then, the query assistive engine 120 starts asking questions about the related custodians. Once the query assistive engine 120 finds the few groups and the given technology area, the query assistive engine 120 expands the scope of finding the custodians using, for example, a Human Resources (HR) database.

The query assistive engine 120 enhances the e-discovery system 110 with a semantic knowledge graph. In particular, the query assistive engine 120 integrates the following sources of information within the semantic knowledge graph: legal matter type, queries posed for the legal matter, keywords used for the legal matter, and feedback.

The legal matter type may be described as metadata associated with the legal matter. In certain embodiments, the legal matters are pre-classified into legal matter types and classification information is available to the query assistive engine 120 for each legal matter.

The queries posed for the legal matter may be described as historical e-discovery queries. During the course of the legal matter, multiple e-discovery queries may be posed against the e-discovery system 110 in order to identify relevant data sets and act on them. These e-discovery queries may be described as the legal user's expressions of what the relevant data encompasses and are a translation from the semantic domain of the legal matter to the metadata-rich and content-rich domain of the IT systems where the data resides and is managed. The query assistive engine 120 utilizes an e-discovery glossary to map clauses in a query expression to well-known terms in the e-discovery semantic domai, and extracts semantic knowledge of which e-discovery query expressions are typically put in use for a given legal matter. For example, a query clause, such as "Any email address field contains s.*@company.com" may be interpreted semantically as "Broad Custodian Search" and "Electronic Mail Investigation" using a standard e-discovery glossary. Another example may be to find all the documents with financial information, Here the financial information may be mapped to a union of "credit", "quarterly report", "debit", "financial transaction", "buy", "sell", etc.

Keywords used for the legal matter are used by the query assistive engine 120. Each legal matter typically involves identification requests that pose e-discovery queries including keywords and phrases found within the content of documents and records. The keywords carry semantic information about the legal matter and what kind of data is relevant to the legal user for this particular legal matter. The query assistive engine 120 infers the semantic meaning of the use of a keyword within a query by locating the keyword within the documents that match the keyword and using Natural Language Processing (NLP) techniques to determine the "Entity Type" associated with the keyword. The query assistive engine 120 is able to do this because of access to, not only the e-discovery queries, but also the content of the documents and records that match the e-discovery queries.

The success of the e-discovery queries and the e-discovery process supported by embodiments may be measured using feedback from the legal user. The feedback may exclude some issues, such as performance of the query assistive engine 120 and procedural delays external to the query assistive engine 120 and only focus on evaluating the effectiveness of the query assistive engine 120. In certain embodiments, the query assistive engine 120 collects metrics as feedback from the legal users. The metrics may include: 1) expenses attached to human review post exporting relevant data from the system, 2) percentage of relevant documents found within the originally identified export post human review, and 3) other metrics directly available to the query assistive engine 110, which include a) discarded data identification requests, b) number and size of unique data sets created for the legal matter, and c) number of iterations involved in creating data sets for the legal matter. Using appropriate weights determined by the legal matter context, this feedback may be used to reinforce certain query clauses and combinations, while at the same time discouraging others.

The legal matter type, queries posed for the legal matter, keywords used for the legal matter, and feedback are forged into an evolving semantic knowledge graph that is composed of the following node types: legal matter type node type, expression term node type, and semantic type node type.

A legal matter type node type represents a legal matter type. A legal matter type node may be a root node (a "C" node). The legal matter type may be inferred from the legal matter classification information available with the legal matter context.

Expression term node types represent expression terms of expression term nodes ("E" nodes). Expression terms may be directly extracted from the queries posed for the legal matter. The expression terms are either the Left Hand Side (LHS) terms used in clauses within an expression or the keywords posed in the e-discovery query. The expression terms are attached to corresponding semantic nodes ("S" nodes). In certain embodiments, weights on the edges connecting "S" nodes and the "E" are a factor of how often the expression terms and semantic types were associated with each other.

Semantic type node types represent semantic types of semantic type nodes ("S" nodes). Semantic types may be inferred from the e-discovery queries posed for the legal matter. In the case of expression terms extracted from clauses, the semantic type may be determined in conjunction with a standard e-discovery glossary. In the case of keyword terms, the semantic type may be inferred from the corpus of documents that match the keyword and provide an insight into what kind of Natural Language entity the keyword is. "S" nodes are attached to a particular "C" root node. Weights on the edges between the "C" node and "S" nodes are a multiple of the confidence associated with the inference of the semantic term multiplied by the number of times the association was noted for the same "C" node. In certain embodiments, a semantic term is an actual instance of the semantic type (e.g., an occurrence of the semantic type).

The "S" nodes and the "E" nodes are used as predicate values to assist a legal user in the future. Feedback may be used to temper the weights of the edges connecting the "S" nodes and the "E" nodes. For example, relevance of results to human review may be an important tempering factor for the weights introduced by a particular legal matter.

The semantic knowledge graph may be used to provide an assist to a legal user at runtime while preparing e-discovery queries for the legal matter. A ranked recommendation list of semantic terms to introduce into the query may be made available when the legal user is trying to fulfill a data identification request. Once a semantic term has been selected, a ranked recommendation list of actual expression terms to choose from may be made available.

Embodiments include a map for well-known metadata fields and operator combinations to the e-discovery glossary. For example, the map links the field "Any email address" to "Electronic Mail Investigation" in the e-discovery glossary. The map will also link the operator "contains" used with "Any email address" to "Broad Custodian Search".

In certain embodiments, the query assistive engine 120 adds an "M" node to the semantic knowledge graph for each new legal matter type based on the classification applicable to the legal matter.

When an e-discovery query "Q" is applied to the legal matter, the query is executed by the e-discovery system 110, and the results of the query (documents) are fetched. When the e-discovery query "Q" is saved, the results (a list of documents "L") are also persisted and readily accessible.

The query assistive engine 120 decomposes the e-discovery query into clauses. Each clause is either a Boolean predicate clause or a text clause composed of any combination of keywords, phrases, and expressions. For example: "Email/To contains john" is a Boolean predicate clause that utilizes a metadata field called "Email/To" on the LHS, the operator "contains" and the value "john". An example of a text clause is "patent or disclosure", which looks for the keywords "patent" or "disclosure" in the document text.

The query assistive engine 120 decomposes each text clause into keywords, phrases, and expressions. For example, "patent or disclosure" is decomposed to the keywords "patent" and "disclosure".

The query assistive engine 120 maps each clause to a semantic type. For each predicate clause, the query assistive engine 120 looks up the metadata field and operator combination in the map and determines the semantic type for the clause from the e-discovery glossary.

The query assistive engine 120 adds the semantic type "S" node to the semantic knowledge graph and attaches the "S" node to the "M" node with an edge of weight 1. If this "S" node already exists, the query assistive engine 120 adds 1 to the weight of the edge.

The query assistive engine 120 adds the metadata field as an expression term "E" node attached to the "S" node with an edge of weight 1. If this "E" node already exists, the query assistive engine 120 adds 1 to the weight of the edge.

For each keyword in a text clause, the query assistive engine 120 runs a partial query for the keyword against a saved result set "L". Let the result of this query be a new set L' with sizeof(L') number of documents. For each document in L', the query assistive engine 120 retrieves the surrounding text around the location within the document where the keyword was found ((N characters before and N character after). The query assistive engine 120 retrieves enough text to form at least a full sentence.

The query assistive engine 120 performs Named Entity Recognition (NER) on this keyword using the surrounding text as context. The query assistive engine 120 detects the entity type for this keyword, which is saved as a semantic type node "S" attached to node "M". The weight of the connecting edge is (1/sizeof(L')). If this node "S" already exists, the query assistive engine 120 adds (1/sizeof(L')) to the weight of the edge. The adds the keyword as an expression term "E" node attached to the "S" node with an edge of weight 1. If this node "E" already exists, the query assistive engine 120 adds 1 to the weight of the edge.

Embodiments provide a technique to extract, derive and use legal matter semantics and glossary terms from historic e-discovery queries made in traditional e-discovery systems.

Embodiments enable the e-discovery system to better understand a legal user's requirements and translate them to actions that the e-discovery system takes on behalf of or in combination with IT teams, which makes it easier to fulfill e-discovery requests in a timely manner.

Embodiments extracting legal semantics from e-discovery metadata predicates and deep content terms are used to build legal matter knowledge that may be represented as an e-discovery glossary and semantic knowledge graph. Embodiments exploit the semantic knowledge graph for generating e-discovery queries.

Figure 7:
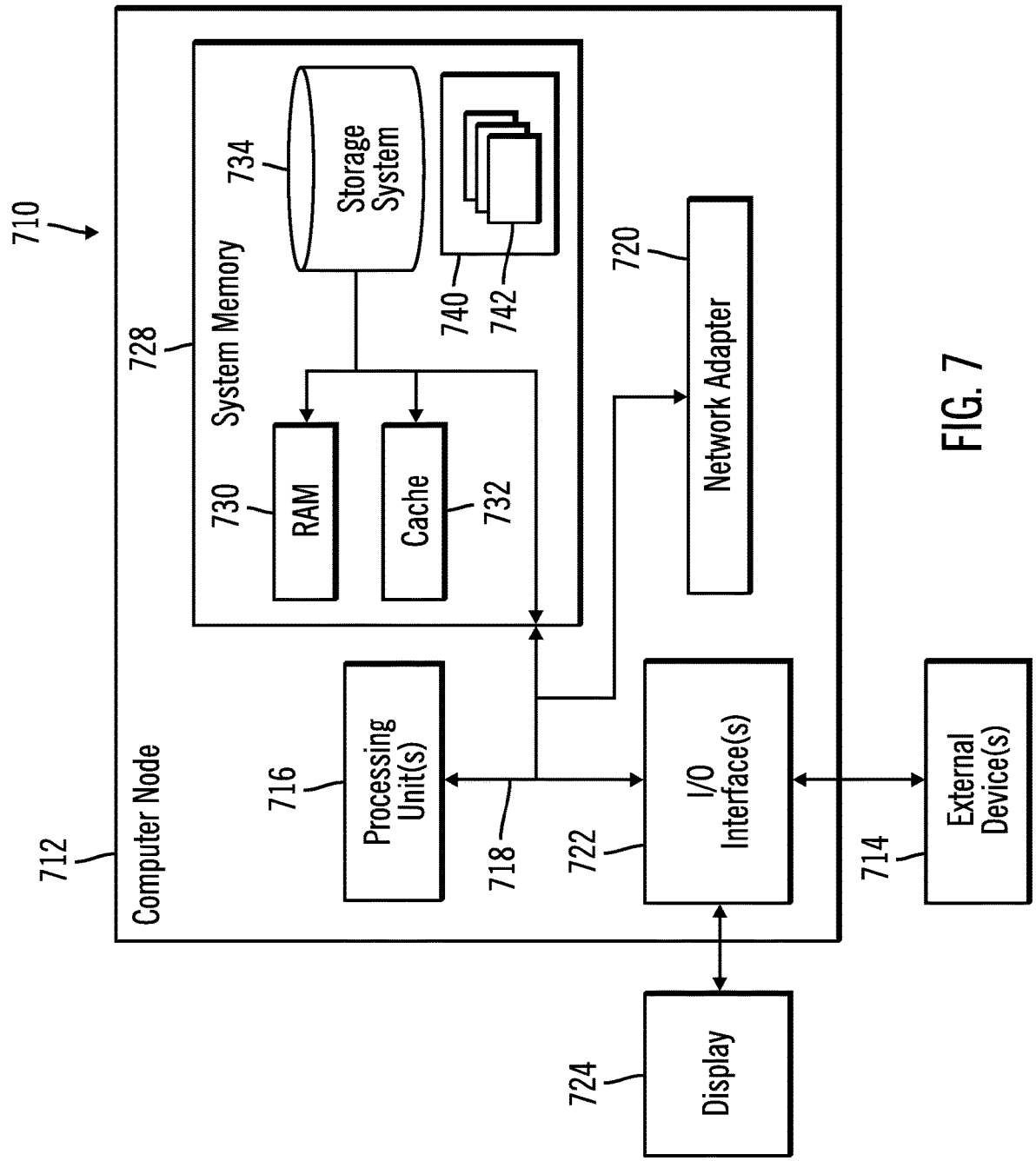
FIG. 7 illustrates a computing node in accordance with certain embodiments.

FIG. 7 illustrates a computing environment 710 in accordance with certain embodiments. In certain embodiments, the computing environment is a cloud computing environment. Referring to FIG. 7, computer node 712 is only one example of a suitable computing node and is not intended to suggest any limitation as to the scope of use or functionality of embodiments of the invention described herein. Regardless, computer node 712 is capable of being implemented and/or performing any of the functionality set forth hereinabove.

The computer node 712 may be a computer system, which is operational with numerous other general purpose or special purpose computing system environments or configurations. Examples of well-known computing systems, environments, and/or configurations that may be suitable for use with computer node 712 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer node 712 may be described in the general context of computer system executable instructions, such as program modules, being executed by a computer system. Generally, program modules may include routines, programs, objects, components, logic, data structures, and so on that perform particular tasks or implement particular abstract data types. Computer node 712 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 7, computer node 712 is shown in the form of a general-purpose computing device. The components of computer node 712 may include, but are not limited to, one or more processors or processing units 716, a system memory 728, and a bus 718 that couples various system components including system memory 728 to one or more processors or processing units 716.

Bus 718 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer node 712 typically includes a variety of computer system readable media. Such media may be any available media that is accessible by computer node 712, and it includes both volatile and non-volatile media, removable and non-removable media.

System memory 728 can include computer system readable media in the form of volatile memory, such as random access memory (RAM) 730 and/or cache memory 732. Computer node 712 may further include other removable/non-removable, volatile/non-volatile computer system storage media. By way of example only, storage system 734 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 718 by one or more data media interfaces. As will be further depicted and described below, system memory 728 may include at least one program product having a set (e.g., at least one) of program modules that are configured to carry out the functions of embodiments of the invention.

Program/utility 740, having a set (at least one) of program modules 742, may be stored in system memory 728 by way of example, and not limitation, as well as an operating system, one or more application programs, other program modules, and program data. Each of the operating system, one or more application programs, other program modules, and program data or some combination thereof, may include an implementation of a networking environment. Program modules 742 generally carry out the functions and/or methodologies of embodiments of the invention as described herein.

Computer node 712 may also communicate with one or more external devices 714 such as a keyboard, a pointing device, a display 724, etc.; one or more devices that enable a user to interact with computer node 712; and/or any devices (e.g., network card, modem, etc.) that enable computer node 712 to communicate with one or more other computing devices. Such communication can occur via Input/Output (I/O) interfaces 722. Still yet, computer node 712 can communicate with one or more networks such as a local area network (LAN), a general wide area network (WAN), and/or a public network (e.g., the Internet) via network adapter 720. As depicted, network adapter 720 communicates with the other components of computer node 712 via bus 718. It should be understood that although not shown, other hardware and/or software components could be used in conjunction with computer node 712. Examples, include, but are not limited to: microcode, device drivers, redundant processing units, external disk drive arrays, RAID systems, tape drives, and data archival storage systems, etc.

In certain embodiments, the computing device 100 has the architecture of computer node 712. In certain embodiments, the computing device 100 is part of a cloud infrastructure. In certain alternative embodiments, the computing device 100 is not part of a cloud infrastructure.

Cloud Embodiments

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 8:
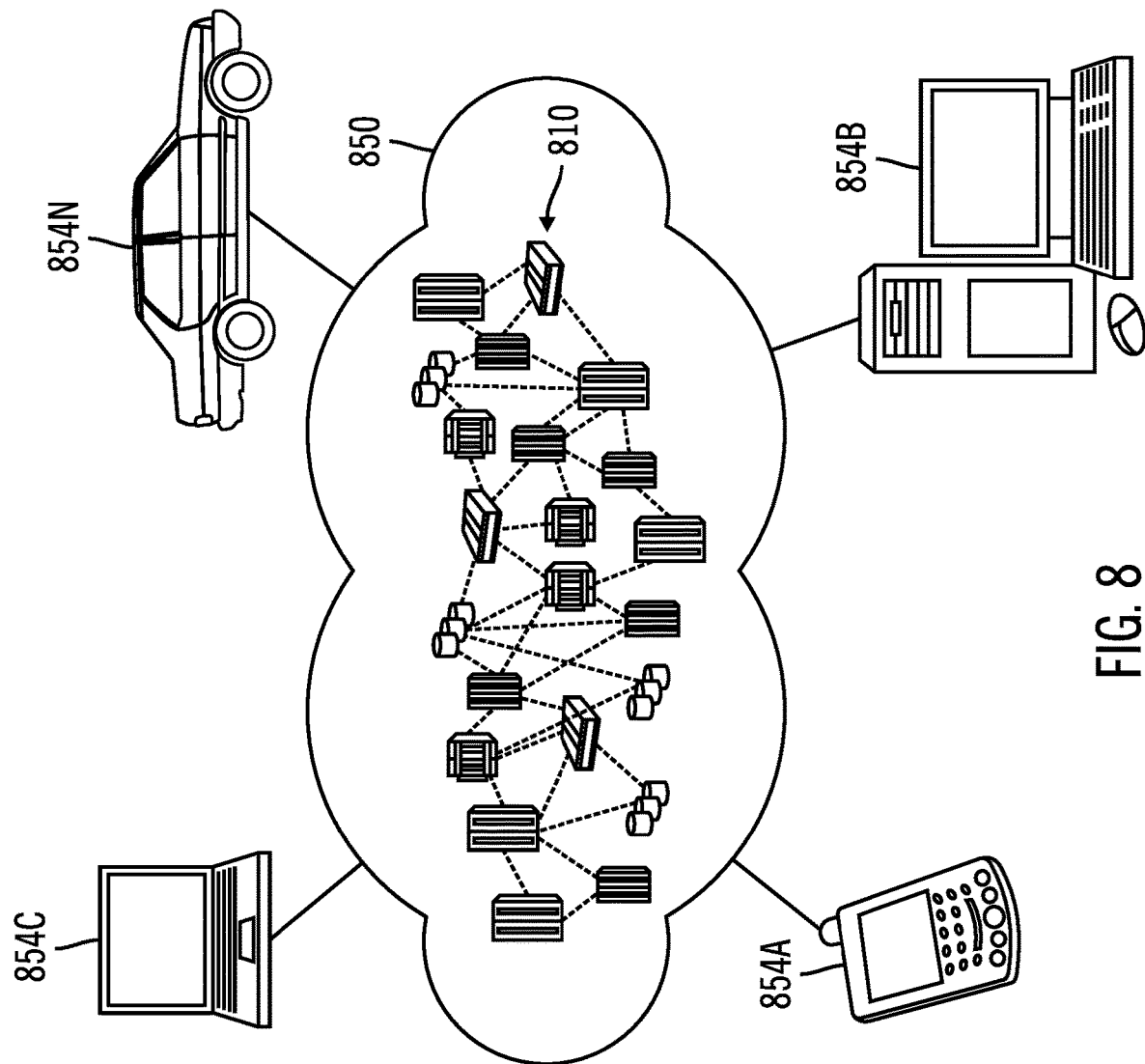
FIG. 8 illustrates a cloud computing environment in accordance with certain embodiments.

Referring now to FIG. 8, illustrative cloud computing environment 850 is depicted. As shown, cloud computing environment 850 includes one or more cloud computing nodes 810 with which local computing devices used by cloud consumers, such as, for example, personal digital assistant (PDA) or cellular telephone 854A, desktop computer 854B, laptop computer 854C, and/or automobile computer system 854N may communicate. Nodes 810 may communicate with one another. They may be grouped (not shown) physically or virtually, in one or more networks, such as Private, Community, Public, or Hybrid clouds as described hereinabove, or a combination thereof. This allows cloud computing environment 850 to offer infrastructure, platforms and/or software as services for which a cloud consumer does not need to maintain resources on a local computing device. It is understood that the types of computing devices 854A-N shown in FIG. 8 are intended to be illustrative only and that computing nodes 810 and cloud computing environment 850 can communicate with any type of computerized device over any type of network and/or network addressable connection (e.g., using a web browser).

Figure 9:
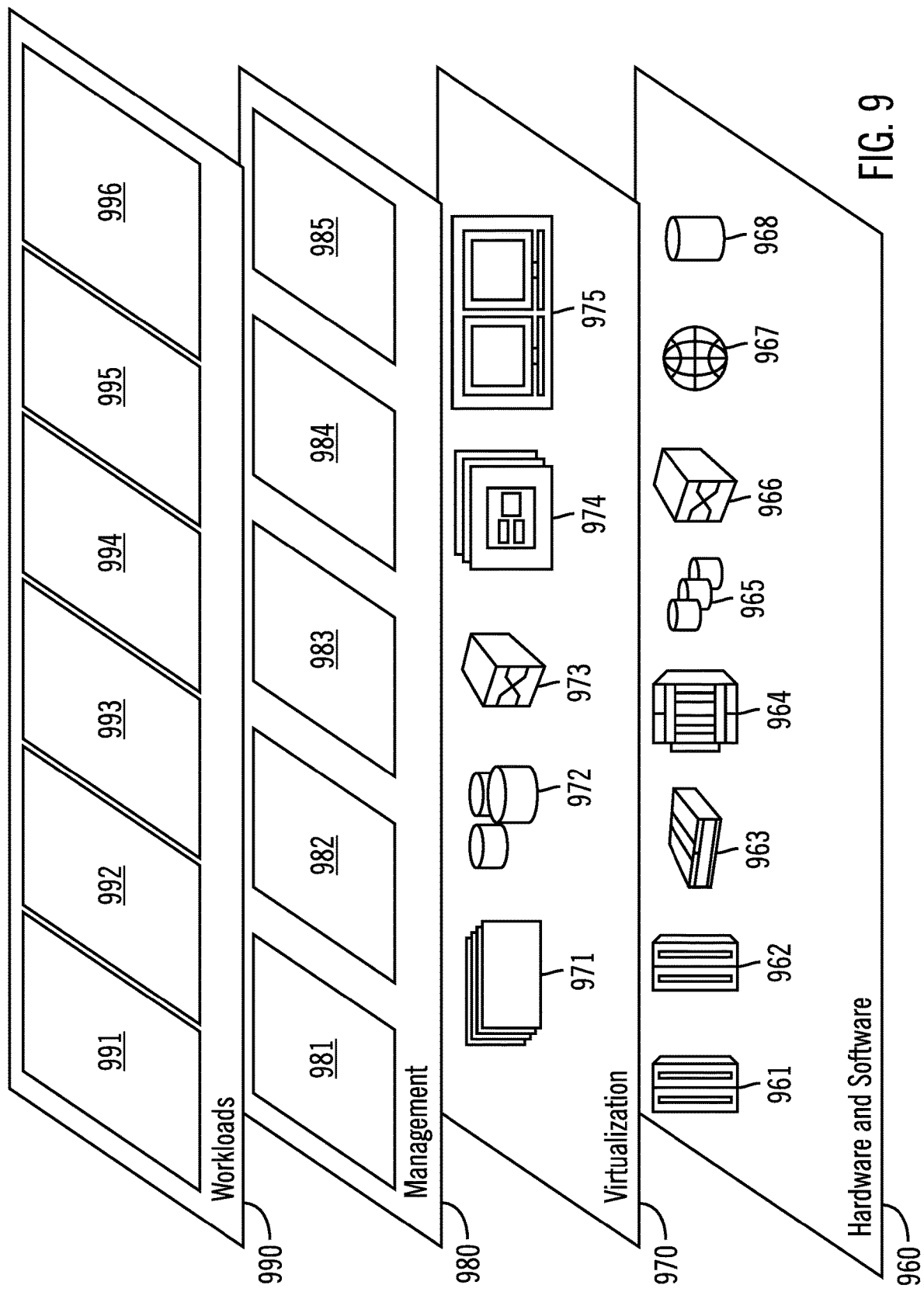
FIG. 9 illustrates abstraction model layers in accordance with certain embodiments.

Referring now to FIG. 9, a set of functional abstraction layers provided by cloud computing environment 850 (FIG. 8) is shown. It should be understood in advance that the components, layers, and functions shown in FIG. 9 are intended to be illustrative only and embodiments of the invention are not limited thereto. As depicted, the following layers and corresponding functions are provided:

Hardware and software layer 960 includes hardware and software components. Examples of hardware components include: mainframes 961; RISC (Reduced Instruction Set Computer) architecture based servers 962; servers 963; blade servers 964; storage devices 965; and networks and networking components 966. In some embodiments, software components include network application server software 967 and database software 968.

Virtualization layer 970 provides an abstraction layer from which the following examples of virtual entities may be provided: virtual servers 971; virtual storage 972; virtual networks 973, including virtual private networks; virtual applications and operating systems 974; and virtual clients 975.

In one example, management layer 980 may provide the functions described below. Resource provisioning 981 provides dynamic procurement of computing resources and other resources that are utilized to perform tasks within the cloud computing environment. Metering and Pricing 982 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 983 provides access to the cloud computing environment for consumers and system administrators. Service level management 984 provides cloud computing resource allocation and management such that required service levels are met. Service Level Agreement (SLA) planning and fulfillment 985 provide pre-arrangement for, and procurement of, cloud computing resources for which a future requirement is anticipated in accordance with an SLA.

Workloads layer 990 provides examples of functionality for which the cloud computing environment may be utilized. Examples of workloads and functions which may be provided from this layer include: mapping and navigation 991; software development and lifecycle management 992; virtual classroom education delivery 993; data analytics processing 994; transaction processing 995; and extracting, deriving, and using legal matter semantics to generate e-discovery queries in an e-discovery system 996.

Thus, in certain embodiments, software or a program, implementing extracting, deriving, and using legal matter semantics to generate e-discovery queries in an e-discovery system in accordance with embodiments described herein, is provided as a service in a cloud environment.

Additional Embodiment Details

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The foregoing description provides examples of embodiments of the invention, and variations and substitutions may be made in other embodiments.

What is claimed is:

1. A computer-implemented method for generating e-discovery queries for an e-discovery system comprising:
   iteratively building a semantic knowledge graph during a build phase by,
      receiving meet and confer document instances, legal matter types, historical e-discovery queries for different legal matters, and legal semantic types extracted from the historical e-discovery queries;
      adding the legal semantic types to the semantic knowledge graph;
      in response to adding the legal semantic types to the semantic knowledge graph, identifying a list of terms that serve as a basis of an initial query; and
      generating an e-discovery query for an e-discovery system by:
         1) mapping a predicate clause of the initial query to a legal semantic type by:
            identifying a metadata field and operator combination;
            determining the legal semantic type from a glossary;
            adding a first semantic type node to the semantic knowledge graph;
            connecting the first semantic type node to a legal matter node with an edge weight; and
            adding an expression term node for the metadata field with another edge weight; and
         2) mapping a keyword of a text clause of the initial query to a legal semantic type by:
            running a partial query for the keyword against a saved result set to generate a new result set; and
            for each document in the new result set,
               retrieving surrounding text around a location within the document where the keyword was found;
               applying Named Entity Recognition (NER) to the keyword using surrounding text as context;
               adding a second semantic type node for an entity type node;
               connecting the second semantic type node to the legal matter node with an edge weight; and
               adding an expression term node for the keyword with another edge weight; and
   modifying the e-discovery query using the semantic knowledge graph and additional input during a query generation phase by:
      receiving a legal matter type and meet and confer information;
      issuing a series of questions to obtain the legal semantic types that are relevant to the legal matter type and the meet and confer information, wherein a priority of an order of questions is determined by weight associated with occurrence of those legal semantic types in the semantic knowledge graph;
      modifying the e-discovery query based on the obtained legal semantic types to add one or more predicates that capture historical information based on user feedback responding to the series of questions;
      providing the modified e-discovery query as a suggested query; and
      in response to receiving selection of the modified e-discovery query, executing the modified e-discovery query.

2. The computer-implemented method of claim 1, wherein the meet and confer document instances are any of digital instances and physical instances.

3. The computer-implemented method of claim 1, further comprising:
   providing a map for metadata fields and operator combinations.

4. The computer-implemented method of claim 1, further comprising:
   providing a text index for documents.

5. The computer-implemented method of claim 1, further comprising:
   receiving feedback on the modified e-discovery query to improve the semantic knowledge graph.

6. The computer-implemented method of claim 1, wherein a Software as a Service (SaaS) is configured to perform method operations.

7. A computer program product for generating e-discovery queries for an e-discovery system, the computer program product comprising a computer readable storage medium having program code embodied therewith, the program code executable by at least one processor to perform:
   iteratively building a semantic knowledge graph during a build phase by, receiving meet and confer document instances, legal matter types, historical e-discovery queries for different legal matters, and legal semantic types extracted from the historical e-discovery queries;

adding the legal semantic types to the semantic knowledge graph;

in response to adding the legal semantic types to the semantic knowledge graph, identifying a list of terms that serve as a basis of an initial query; and generating an e-discovery query to for e-discovery system by:

1) mapping a predicate clause of the initial query to a legal semantic type by:

identifying a metadata field and operator combination;

determining the legal semantic type from a glossary;

adding a first semantic type node to the semantic knowledge graph;

connecting the first semantic type node to a legal matter node with an edge weight; and adding an expression term node for the metadata field with another edge weight; and 2) mapping a keyword of a text clause of the initial query to a legal semantic type by:

running a partial query for the keyword against a saved result set to generate a new result set; and for each document in the new result set, retrieving surrounding text around a location within the document where the keyword was found;

applying Named Entity Recognition (NER) to the keyword using the surrounding text as context;

adding a second semantic type node for an entity type node;

connecting the second semantic type node to the legal matter node with an edge weight; and adding an expression term node for the keyword with another edge weight; and modifying the e-discovery query using the semantic knowledge graph and additional input during a query generation phase by:

receiving a legal matter type and meet and confer information;

issuing a series of questions to obtain the legal semantic types that are relevant to the legal matter type and the meet and confer information, wherein a priority of an order of questions is determined by weight associated with occurrence of those legal semantic types in the semantic knowledge graph;

modifying the e-discovery query based on the obtained legal semantic types to add one or more predicates that capture historical information based on user feedback responding to the series of questions;

providing the modified e-discovery query as a suggested query; and in response to receiving selection of the modified e-discovery query, executing the modified e-discovery query.

8. The computer program product of claim 7, wherein the meet and confer document instances are any of digital instances and physical instances.

9. The computer program product of claim 7, wherein the program code is executable by the at least one processor to perform:

providing a map for metadata fields and operator combinations.

10. The computer program product of claim 7, wherein the program code is executable by the at least one processor to perform:

providing a text index for documents.

11. The computer program product of claim 7, wherein the program code is executable by the at least one processor to perform:

receiving feedback on the modified e-discovery query to improve the semantic knowledge graph.

12. The computer program product of claim 7, wherein a Software as a Service (SaaS) is configured to perform computer program product operations.

13. A computer system for generating e-discovery queries for an e-discovery system, comprising:

one or more processors, one or more computer-readable memories and one or more computer-readable, tangible storage devices; and program instructions, stored on at least one of the one or more computer-readable, tangible storage devices for execution by at least one of the one or more processors via at least one of the one or more memories, to perform operations comprising:

iteratively building a semantic knowledge graph during a build phase by, receiving meet and confer document instances, legal matter types, historical e-discovery queries for different legal matters, and legal semantic types extracted from the historical e-discovery queries;

adding the legal semantic types to the semantic knowledge graph;

in response to adding the legal semantic types to the semantic knowledge graph, identifying a list of terms that serve as a basis of an initial query; and generating an e-discovery query to for e-discovery system by:

1) mapping a predicate clause of the initial query to a legal semantic type by:

identifying a metadata field and operator combination;

determining the legal semantic type from a glossary;

adding a first semantic type node to the semantic knowledge graph;

connecting the first semantic type node to a legal matter node with an edge weight; and adding an expression term node for the metadata field with another edge weight; and 2) mapping a keyword of a text clause of the initial query to a legal semantic type by:

running a partial query for the keyword against a saved result set to generate a new result set; and for each document in the new result set, retrieving surrounding text around a location within the document where the keyword was found;

applying Named Entity Recognition (NER) to the keyword using surrounding text as context;

adding a second semantic type node for an entity type node;

connecting the second semantic type node to the legal matter node with an edge weight; and adding an expression term node for the keyword with another edge weight; and modifying the e-discovery query using the semantic knowledge graph and additional input during a query generation phase by:

receiving a legal matter type and meet and confer information;

issuing a series of questions to obtain the legal semantic types that are relevant to the legal matter type and the meet and confer information, wherein a priority of an order of questions is determined by weight associated with occurrence of those legal semantic types in the semantic knowledge graph;

modifying the e-discovery query based on the obtained legal semantic types to add one or more predicates that capture historical information based on user feedback responding to the series of questions;

providing the modified e-discovery query as a suggested query; and in response to receiving selection of the modified e-discovery query, executing the modified e-discovery query.

14. The computer system of claim 13, wherein the meet and confer document instances are any of digital instances and physical instances.

15. The computer system of claim 13, wherein the operations further comprise:

providing a map for metadata fields and operator combinations.

16. The computer system of claim 13, wherein the operations further comprise:

providing a text index for documents.

17. The computer system of claim 13, wherein the operations further comprise:

receiving feedback on the modified e-discovery query to improve the semantic knowledge graph.

18. The computer system of claim 13, wherein a Software as a Service (SaaS) is configured to perform computer system operations.

* * * * *